Sept. 1, 1942.    R. W. CARSON    2,294,831
APPARATUS FOR MAKING VERY FINE MEASUREMENTS
Filed Jan. 21, 1941    4 Sheets-Sheet 1
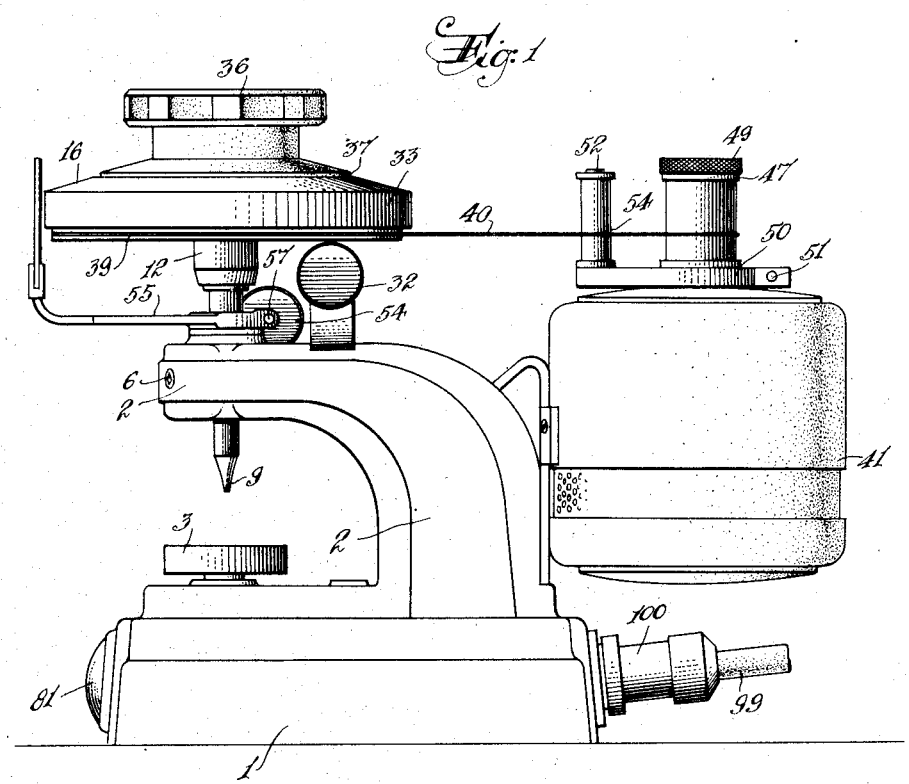
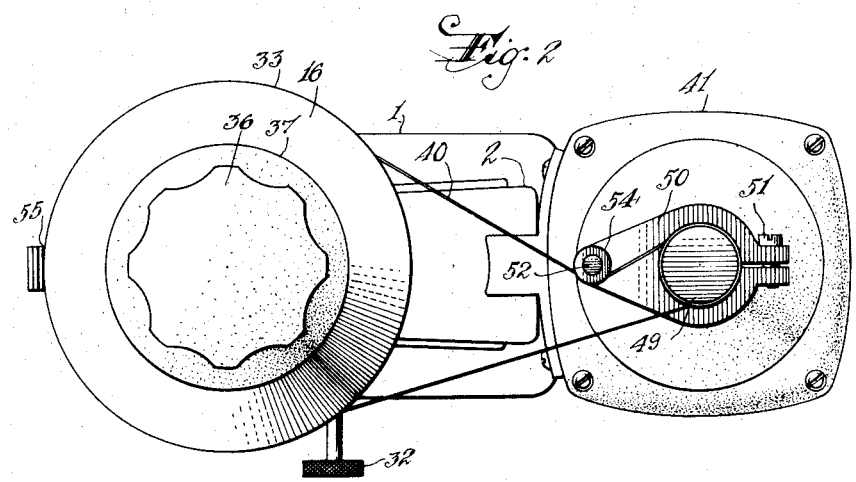
INVENTOR
Robert W. Carson
BY
A. D. T. Libby
ATTORNEY Sept. 1, 1942.   R. W. CARSON   2,294,831
APPARATUS FOR MAKING VERY FINE MEASUREMENTS
Filed Jan. 21, 1941   4 Sheets-Sheet 2
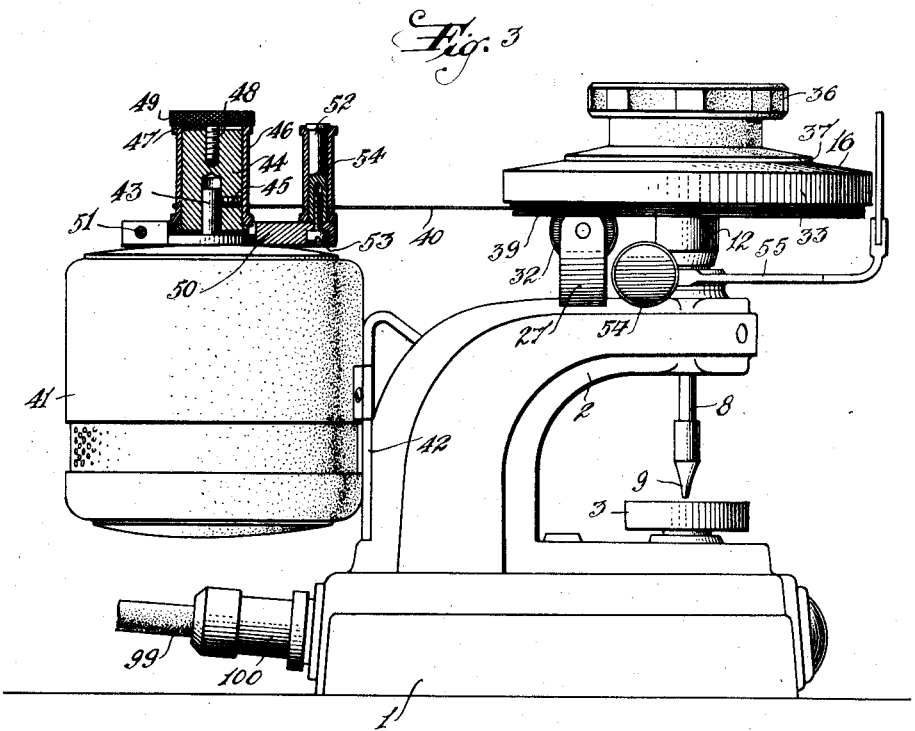
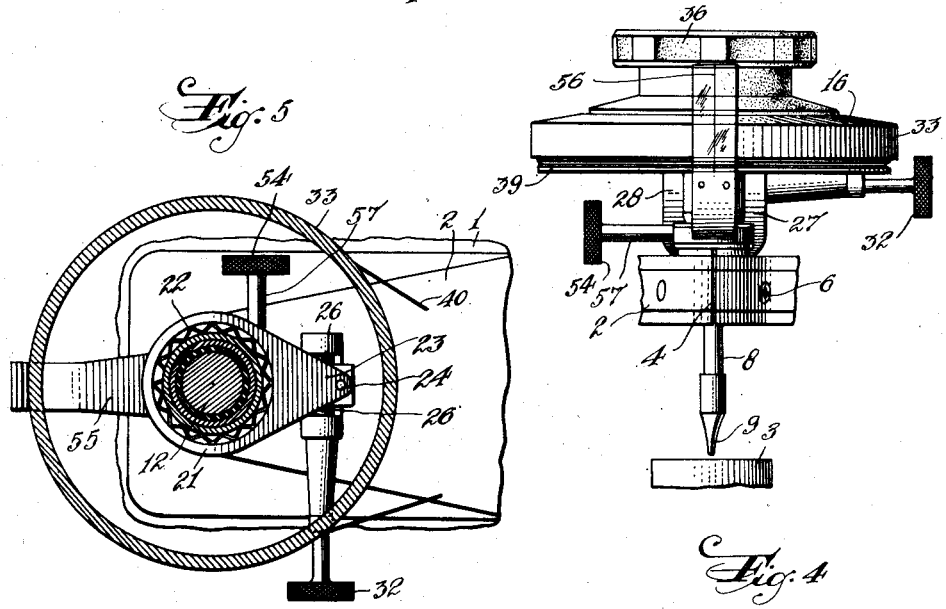
INVENTOR
Robert W. Carson
BY
A. D. T. Libby
ATTORNEY

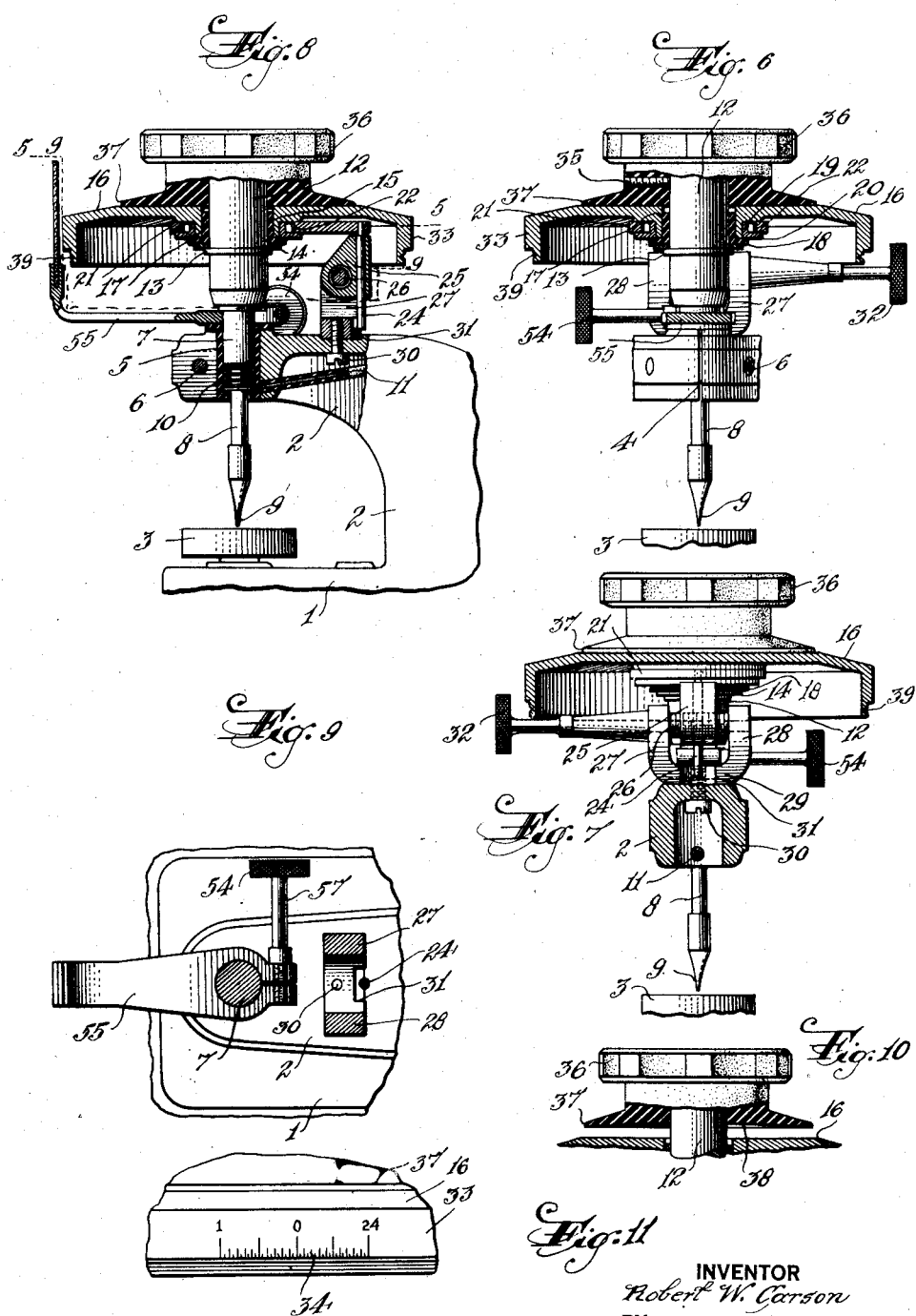

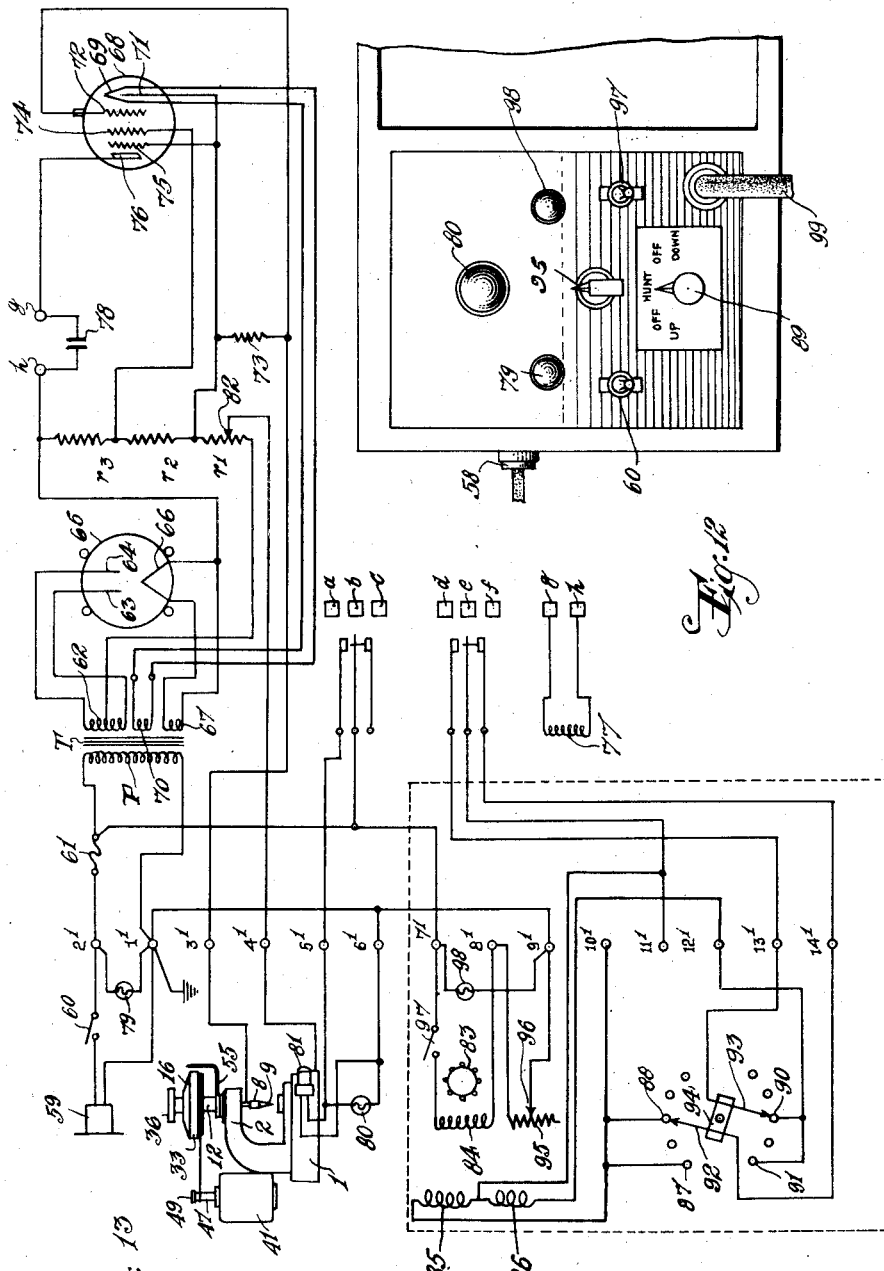

Patented Sept. 1, 1942

2,294,831

UNITED STATES PATENT OFFICE 2,294,831

APPARATUS FOR MAKING VERY FINE MEASUREMENTS

Robert W. Carson, Little Falls, N. J.

Application January 21, 1941, Serial No. 375,101

18 Claims. (Cl. 33—164)

This invention relates to apparatus for making exceedingly fine measurements.

In my Patent 2,005,887, issued June 25, 1935, I have shown and described and claimed broadly a type of apparatus which is directed to the problem of making pressureless or very fine thickness measurements. This patent discusses the theory of operation to some extent and in a way applies to my present application.

In my pending application, Serial No. 274,522, filed May 19, 1939, I have shown and described practical means for applying the theoretical principle set forth in the above-mentioned patent. By further study and experimentation, I have discovered how to make a very much more sensitive and accurate electronic micrometer than any of the previous constructions, including that shown in my patent and application just referred to.

My present invention therefore has for its general object the provision of an electronic micrometer which is to a great extent automatic in its operation and one that is very much more sensitive and accurate than prior constructions of this kind.

Another object of my invention is to provide a super or extra fine adjustment for the micrometer where extreme accuracy is essential.

Another object of my invention is to provide apparatus in which the current is zero across the micrometer contacts at the instant the measurement is or should be taken.

These main objects, together with other ancillary objects, will appear from the following description taken in connection with the annexed drawings, wherein:

Figure 1 is a side view of the complete micrometer assembly unit.

Figure 2 is a plan view looking down on the top of Figure 1.

Figure 3 is a view similar to Figure 1 but looking from the opposite side, certain parts of the motor being shown in section.

Figure 4 is what might be termed a front elevational view of the micrometer per se.

Figure 5 is a section on the line 5—5 of Figure 8.

Figure 6 is a view of Figure 4, partly in section and partly in elevation.

Figure 7 is a view similar to Figure 6 but in reverse position.

Figure 8 is a vertical view, partly in section and partly in elevation, through the micrometer and a part of the support arm shown in Figure 1.

Figure 9 is a view on the line 9—9 of Figure 8.

Figure 10 is a view of the upper part of the micrometer showing the control knob slightly separated from its normal position to indicate the construction of the engaging surface of the knob on the dial.

Figure 11 is a fragmentary view of the edge of the dial showing how the scale on the dial is divided. The scale is full size.

Figure 12 is a partial view of the front of a control panel which comprises part of the apparatus.

Figure 13 is a wiring diagram of the control box shown in Figure 12 and its connections to the micrometer and motor.

In the various views, wherein like numbers refer to corresponding parts, 1 is a base having an arm 2 extending upwardly therefrom and over an article-receiving support 3. The support 3 is mounted on the base 1 so that it may be rotatably or vertically adjusted with respect thereto. The arm 2 is preferably cast integral with the base 1 so as to form a very rigid support for a micrometer. The end of the arm 2 is preferably split at 4 so as to receive a bushing 5 of suitable insulating material, after which the split ends of the arm are drawn together by screws 6 to securely grip the insulator 5 which is slightly compressible so as to rigidly clamp the sleeve 7 of the micrometer which has a spindle 8 rotatably carried by the sleeve 7. The spindle 8 terminates in a very fine point 9 adapted to be brought into engagement with an article on the support 3 in a manner to be later described.

Positioned within the cup-shape type insulator 5 and compressed by the end of the sleeve 7 when the micrometer is mounted in the end of the arm 2, is a spring 10. Fastened to the spring 10, by welding or soldering, is a conductor 11 which is brought up through the base and the hollow arm 2. To the upper end of the spindle 8 is fastened in the usual manner for micrometers a barrel 12. The barrel 12 has an exterior shoulder 13 on which rests a washer 14 and an insulator 15. A dial 16 has a centrally located hole to receive or fit over the insulator 15. A downwardly projecting flange 17 engages a flange 18 on the insulator 15. The flange 18 also supports a ring or bushing 19 preferably made of bronze, which is press-fitted or otherwise fastened over the flange 17 of the dial 16 and has an outwardly extending annular flange 20.

On the flange 20 is positioned a collar 21, and positioned between the collar 21 and the ring 19 is a corrugated type of washer 22 (see Figure 5) preferably made of beryllium copper which produces a certain amount of frictional engagement between the ring 19 and the collar 21.

The end of the collar 21 has an arm or projection 23 to which is attached a pin 24 that extends downwardly through a traveler nut 25 that in turn is carried on a worm or screw shaft 26 supported by the arms 27 and 28 of a saddle 29 fastened in any satisfactory manner as by a screw 30 to the end of the arm 2 adjacent the barrel and spindle of the micrometer. The saddle has a notch 31 therein, within the side edges of which the pin 24 is positioned so that as the screw shaft 26 is turned by the knob 32 and carries the traveler nut 25 with it, the movement is limited by the width of the notch 31. Because of the frictional engagement produced by the spring 22, the turning of the thumb nut 32 through the worm drive just described will, through the bushing 19, produce a slight rotation of the dial 16 which has a depending edge or flange 33, on which scale divisions 34 are provided, there being on the circumference of the dial, 500 equally spaced divisions. Reference will be later made to this fine adjustment.

Fastened to the upper end of the barrel 12 as by a set screw 35 is a hand-operated device or knob 36 having a circular disc portion 37 which engages the flat portion on the upper part of the dial 16. Preferably the engaging surface of the disc portion 37 is relieved as indicated at 38 so that when the knob is pressed downwardly onto the dial, the outer peripheral edge engages the dial first, so as to get a good gripping contact therewith, after which the set screw 35 locks the knob 36 in position so that the micrometer may be operated by hand through the knob 36, it being understood that the frictional engagement of the fine adjustment previously described will allow this manual operation of the micrometer through the knob 36.

The flange 33 of the dial 16 is provided with a formation in the form of a groove 39 to receive a cord or thread-like belt 40 which is positioned around a pulley operated by an electric motor 41 that is supported by a bracket 42 which may be fastened to the arms 2 or directly to the base 1. In either case, the motor is supported through the medium of the base. The electrical characteristics of the motor 41 will be referred to more in detail in connection with the description of Figure 13. Suffice it to say at this point that it is of the shaded pole reversing type having a speed of 3600 R. P. M. and connected through an 1800-to-1 gear reduction built in as a part of the motor, so that the output shaft 43 has a maximum speed of 2 R. P. M., but by means of a rheostat mounted in the electronic unit to be later described, its speed may be reduced to approximately .8 R. P. M.

On the output shaft 43 is fastened a member 44 as by a set screw 45. The member 44 is preferably cylindrical and positioned over this is a tube or collar 46 preferably having a slight flange 47 at its outer end. A screw 48 is threaded into the member 44 and has a head 49 of a diameter sufficient to cover the flange 47. By tightening down on the screw 48, so as to make the knurled head 49 engage with the flange 47, a driving connection is established between the shaft 43 and the collar 46 which a smooth outer cylindrical surface to receive the thread-like driving belt 40. Also mounted on the top of the motor frame is an arm 50 which may be arcuately adjustable through means of a lock screw 51. The free end of the arm 50 carries a stud 52, the same being fastened to the arm as by a screw 53. The stud 52 freely carries a pulley 54 having a smooth outer cylindrical surface. The pulley 54 acts as an idler so that sufficient tension may be given the thread-like drive member element 40. It will be noted that the pulleys 46 and 54 have a length corresponding or compatible with the up-and-down travel of the micrometer spindle 8 and the dial 16 carried thereby, through the medium of the barrel 12 as heretofore described.

There are thus three separate, independent drives for the micrometer, the principal one being the motor drive as just described, the manual drive through the medium of the knob 36, and the fine-adjustment drive first described. When it is desired to use the hand operation for measuring, the motor drive may be readily released by releasing the clutch between the parts 47 and 49 by unturning the screw 48.

Carried by the sleeve 7 is an arm 55, the outer end of which supports a hair-sight 56 of transparent material. The sight may be adjusted in any position by means of a control-and-lock screw 57.

Figure 12 shows a portion of the control box containing the apparatus diagrammatically illustrated in the circuit arrangement of Figure 13, with the exception of the combination micrometer and motor unit. A cable 58 brings an A. C. source of supply to a plug adapted to enter a receptacle 59 in the control box. A switch 60 is used for opening the primary circuit any time desired, while the source of power is connected to the receptacle 59. The conductors from the receptacle 59 are connected to binding posts or panel terminals 1' and 2' by way of switch 60. Also connected to the terminals 1' and 2' is the primary P of a transformer T. Preferably, a fuse 61 is incorporated in this primary circuit. The transformer T is provided with three secondary windings, one of which, 62, is connected to the elements 63 and 64 of a double-rectifier tube 65, the cathode 66 of which is connected to the transformer winding 67. Connected across the ouput circuit of the tube 65, is a voltage divider made up of resistances $r_1$, $r_2$, and $r_3$.

A special tube 68 has six elements; to wit, a filament 69 connected to a secondary winding 70 of the transformer T, which filament 69 heats the cathode 71 of the tube 68. The control grid 72 is connected to one terminal of a resistance 73, preferably on the order of five megohms, and also to the spindle 8 of the micrometer by way of the terminal 3'. An accelerator grid 74 is connected to the junction of the resistances $r_2$ and $r_3$. The suppressor grid 75 is connected to one side of the resistance 73 and to the junction of $r_1$ and $r_2$, while the plate 76 is connected to the terminal $g$ which is also one terminal of a very sensitive relay winding 77, the other end of the relay winding being connected to the terminal $h$. Bridging these terminals $h$ and $g$, and consequently the relay, is a condenser 78. The relay contact members are diagrammatically illustrated by the small letters $a$ to $f$ inclusive.

Connected across the terminals 1' nd 2', is a line pilot lamp 79, and connected across the terminals 5' and 6' is a signal light 80 on the control box and an indicating light 81 in the base of the micrometer unit. The terminal 4', which is electrically connected to the base member 1 and the article support member 3, is also connected to an adjustable contact 82 on the resistance $r_1$.

The motor 41 is of the shaded pole reversing type having a rotor 83, an exciting field winding 84, one end of which is connected to one member of the switch 97, the other end of the switch being connected to the terminal 7' while the opposite end of the winding 84 is connected to the terminal 8'; and a pair of directive windings 85 and 86 which are excited by induction from the winding 84 in a manner similar to the secondary of a transformer. The windings 85 and 86 are connected, as indicated, to the terminals 10', 11' and 12'. The terminal 10' is also connected to contacts 87 and 88 on a switch device 89 (see Figure 12). The terminal 12' is connected to contacts 90 and 91 of the switch 89. The terminal 11', which is connected to the common junction of the winding 85 and 86, is connected to the switch member e of the relay 77.

The switch 89 carries two movable switch members 92 and 93, shown diagrammatically, carried by an insulator 94. A resistance 95 has one end connected to the terminal 8', and an adjustable contact 96 is connected to the terminal 9'. 98 is a motor pilot light connected across the terminals 7' and 9'. All the cables or wires going to the micrometer and motor unit are carried in a cable 99 which enters the base 1 of the micrometer through a suitable connecting means 100.

Preliminary to the description of the operation of the apparatus, it may be said that the motor 41 per se runs at a speed of 3600 R. P. M. from a 60-cycle source of alternating current, and the motor unit contains an 1800-to-1 gear reduction so that the output shaft 43 (see Figure 3) turns at a maximum speed of 2 R. P. M., and by means of the rheostat or resistance 95, this speed may be reduced to approximately .8 R. P. M. Then, by a further speed reduction—which exists between the pulley on the motor and the dial 33 or member carried by the rotating system of the micrometer to which the thread belt 49 is connected—the dial is turned very slowly, to which reference will be later made.

Now, assuming that the switch 60 is closed, current is applied to the system and the rectifier tube 65 applies a voltage to the voltage divider and the tube 68, as will be readily understood. The characteristics of the tube 68 are such that the potential of the control grid 72 is slightly negative, and the current through the plate circuit, which includes the relay winding 77, is sufficient to hold the relay in actuated position, whereby the contacts b and c are closed, as well as the contacts e and f. On closure of the switch 97, current is applied to the main winding 84 of the motor, also lighting the motor pilot light 98, and since the contacts e and f are closed, the winding 85 on the motor will be closed through the contact 88 and switch member 92. This will cause the motor to start and the spindle 8 of the micrometer will be turned downwardly toward the object placed on the support 3 and desired to be measured.

When the point 9 of the spindle makes a touch contact with the piece to be measured, the voltage on the resistor $r_1$ is applied to the control grid 72, and the potential thereon will become more negative and the current in the plate circuit will be caused to decrease, and the relay 77 will fall back or close the contacts a and b, and d and e. The closure of a and b will light the indicating lights 80 and 81, and the closure of contacts d and e will cut off the winding 85 and substitute the winding 86 through the contact 90 and switch member 93, it being understood that the switch handle 89 is set to the "hunt" position as indicated in Figure 12. The substitution of the winding 86 will reverse the direction of the motor and move the spindle back almost an infinitessimal amount when the cycle is repeated. It may be said that the hunting range is approximately $\frac{1}{10}$ of one of the divisions shown in Figure 11, or .000005". One reason for having a hunting position on the switch is that should the object being measured be circular and not uniform, then, as the object is turned on the support member 3, the variation in roundness will be indicated by the variation in the hunting operation of the instrument.

When the switch 89 is set to the up or down position indicated in Figure 12, the instrument will respond accordingly. For example, suppose it be turned to the down position, then the switch member 92 will be on the contact 87, while the switch member 93 will be in the "off" position. This will bring in only the winding 85 of the motor and the spindle of the micrometer will be operated downward to the "touch" position, when it will be stopped by the operation of the relay. Then, throwing the switch 89 to the "up" position, the spindle 8 will be backed away from the object being measured.

It may be noted that the accelerator grid 74 enables more plate current to pass at a lower plate voltage, and provides a greater mutual conductance within the tube which is highly essential for the operation of the sensitive relay and the general operation of the circuit.

When the micrometer contacts are open, the voltage on the control grid 72 of the tube 68 is determined by the "contact potential" of the grid, modified by the grid resistor 73 of whatever value is used (in this case, I prefer to make it five megohms). The effect of this grid resistor is to lower the potential of the grid; that is, make it more positive. When the micrometer contacts are in "touch" position, the voltage across $r_1$ is applied to the grid. This voltage can be so adjusted that no current flows across the contacts by virtue of the fact that the actual value of the "contact potential" is sufficiently different from the value as modified by the grid resistor, to cause a sufficient change in the plate current to actuate the relay 77. When the voltage across $r_1$ is adjusted to the actual value of the "contact potential," no current flows across the contacts at the micrometer, and the device is not affected by changes in contact resistance at the micrometer contacts.

This arrangement of obtaining zero current across the micrometer contacts is an object I have long sought, as it completely eliminates any pitting at the contacts and thereby establishes a greater and more permanent degree of accuracy of measurement than any other arrangement with which I have worked.

What I claim is:

1. Apparatus for making very fine measurements including a base member having an article support, a rigid arm carried by the base and extending over the said support, a micrometer assembly having a spindle and a dial carried by the arm over said support, a motor supported through the medium of the base, means for operatively connecting the motor to the micrometer spindle and dial, an electronic circuit connected across the spindle and base support, means controlled by the electronic circuit for operating the motor to actuate the micrometer to make a measurement of an article placed on said support and means interconnected with said means controlled by the electronic circuit for determining at will the movement of the micrometer spindle and dial.

2. Apparatus for making very fine measurements including a base member having an article support, a rigid arm carried by the base and extending over the said support, a micrometer assembly having a spindle carrying a dial adjustably and insulatingly carried by the arm over said support, said assembly including a dial having a flange with a large number of suitable scale divisions thereon and a pulley formation thereon, a motor supported through the medium of the base, a pulley on the motor structure for transmitting power from the motor driving means between the motor pulley and the pulley formation on the dial, an electronic circuit connected across the spindle and base support, means controlled by the electronic circuit for operating the motor to actuate the micrometer to make a measurement of an article placed on said support and means interconnected with said means controlled by the electronic circuit for determining at will the movement of the micrometer spindle and dial.

3. Apparatus as set forth in claim 2, further defined in that the motor pulley has an elongated surface compatible with the length of the up-and-down movement of the dial and spindle for the purpose described.

4. Apparatus for making very fine measurements including a base member having an article support, a rigid arm carried by the base and extending over the said support, a micrometer assembly having a spindle carrying a dial adjustably and insulatingly carried by the arm over said support, said assembly including a dial having a depending flange with a large number of scale divisions thereon and a groove in the lower edge of the flange, a motor supported through the medium of the base, a pulley drivingly connected to the motor and having a peripheral surface on which a driven element may travel longitudinally of the pulley according to the up-and-down travel of the dial and spindle, a string-like element embracing the pulley and the groove in the dial, an electronic circuit connected across the spindle and base support, and means controlled by the electronic circuit for operating the motor to actuate the micrometer to make a measurement of an article placed on said support.

5. Apparatus as set forth in claim 4, further defined in that an adjustable arm is carried by the motor structure, the free end of the arm supporting an idler pulley for engaging the thread-like element and having a length corresponding to the up-and-down travel of the dial and spindle.

6. Apparatus as set forth in claim 4, further defined in that the motor pulley includes a member fastened to a shaft operated by the motor, a collar operatively connected to said member, the collar having an outer cylindrical surface to receive the thread-like element.

7. Apparatus as set forth in claim 4, further defined in that the motor pulley includes a cylindrical member fastened to a shaft operated by the motor, a cylindrical collar positioned over said member and having a smooth outer cylindrical surface to receive the thread-like element, and means coacting between the collar and said cylindrical member to provide a driving connection or clutch between the said two parts.

8. Apparatus as set forth in claim 4, further defined in that the motor pulley includes a cylindrical collar positioned over said member and having a smooth outer cylindrical surface to receive the thread-like element, and a screw going into said cylindrical member and having a head of a diameter sufficient to span the end of said collar which projects beyond said member, and further defined in that an adjustable arm is carried by the motor structure, the free end of the arm supporting an idler pulley for engaging the thread-like element and having a length corresponding to the up-and-down travel of the dial and spindle.

9. Apparatus as set forth in claim 1, further defined in that the micrometer spindle is carried by a sleeve positioned in an insulator carried by said arm, the end of the sleeve resting on a spring which is electrically connected to one side of the electronic circuit.

10. Apparatus as set forth in claim 1, further defined in that the micrometer spindle is carried by a sleeve positioned in an insulator carried by said arm, a barrel rotatably positioned about the sleeve and operatively connected to the spindle, an insulator on the barrel, the said dial being positioned on the last-mentioned insulator, an insulator fastened to the barrel and having a flat portion engaging the upper exterior surface of the dial, and also having a hand engagement part, the insulator being pressed onto the upper surface of the dial sufficiently hard to drivingly carry the dial with the barrel and spindle.

11. Apparatus for making very fine measurements including a micrometer assembly comprising a sleeve for supporting the assembly, a spindle carried within the sleeve, a barrel positioned over the sleeve and attached to the spindle to rotate therewith, a dial carried by the barrel, and means including a hand-operated part attached to the barrel and frictionally engaging the dial for completing a driving connection between the spindle and dial, and means on the rotatable assembly for receiving a power driving element.

12. In an apparatus for making very fine measurements as set forth in claim 11, means for obtaining an extra fine adjustment of the dial and spindle, said means including a depending annular flange on the inner periphery of the dial, a flanged ring around the dial flange, a collar positioned on the flange of the ring and spaced from the body of the ring, a corrugated type of annular spring located in said space and exerting pressure between the ring and collar, an arm extending from the collar, a saddle having a support, an adjusting screw carried by the saddle, a traveler nut on the screw between the arms of the saddle, a pin attached to the collar arm and extending through the nut, the saddle having a recess to receive the free end of the pin and limiting the transverse movement thereof.

13. Apparatus for making very fine measurements including a micrometer assembly comprising, a spindle, a dial mounted for rotation with the spindle and three means for turning the spindle, the first means being a part operatively connected to the spindle for receiving a power-driven thread or belt, a second means comprising a hand engagement device connected to the barrel, and a third means for fine adjustment comprising a collar having frictional engagement with the dial, a hand-operated worm shaft carrying a nut with means connecting the nut to the collar.

14. Apparatus for making very fine measurements including in combination, a unit comprising; a base carrying a support arm and an article support, a micrometer structure carried by the arm and having a movable spindle in cooperative relation to said article support, and an electric motor supported through the medium of the base and drivingly connected to the micrometer; and a control unit including an electronic circuit with associated apparatus, the control side of said circuit being connected across the micrometer spindle and said article support, means governed by the electronic hookup to control the operation of the motor to move the spindle and means adapted to be set to cause the motor to run in either direction of rotation or to hunt at the instant the measurement point of the spindle is reached.

15. Apparatus for making very fine measurements including a motor-driven measuring instrument structure and an electronic circuit connected across the measuring contacts of the instrument, and means governed by the electronic circuit for controlling the operation of the motor when the current across the instrument measuring contacts is zero.

16. Apparatus making very fine pressureless measurements including, a measuring instrument with means for operating it and an electronic circuit connected across the measuring contacts of the instrument, the electronic circuit being such that when touch contact is made by the measuring contacts, the current across these contacts is zero.

17. Apparatus for making very fine pressureless measurements as set forth in claim 16, further defined in that the means for directly operating the measuring instrument in a reversible motor operatively connected to the instrument, and the electronic circuit includes a relay, responsive to changes in an electronic tube comprising part of said circuit, for controlling the operation of the motor.

18. For use in connection with a pair of adjustable metallic contacts; control apparatus, including an electronic unit having elements connected in a circuit including said contacts and elements connected in a circuit having a current-responsive device therein, and cooperative means interconnecting said electronic circuits so that after said contacts are brought into touch-contact, the said current-responsive device is operated while the current through said contacts is substantially zero.

ROBERT W. CARSON.